United States Patent
Ma et al.

[11] Patent Number: 6,066,379
[45] Date of Patent: *May 23, 2000

[54] REPULPABLE, WATER REPELLANT PAPERBOARD

[75] Inventors: Tung Chan Ma, Fort Lee; Arnold L. Berzins, Westwood, both of N.J.; Charles J. Davis, Goshen, N.Y.; Bruce T. Watson, Shreveport, La.

[73] Assignee: International Paper Company, Purchase, N.Y.

[ * ] Notice: This patent is subject to a terminal disclaimer.

[21] Appl. No.: 08/867,251

[22] Filed: Jun. 2, 1997

Related U.S. Application Data

[60] Division of application No. 08/290,645, Aug. 15, 1994, Pat. No. 5,635,279, which is a continuation-in-part of application No. 08/128,582, Sep. 28, 1993, Pat. No. 5,626,945.

[51] Int. Cl.$^7$ ................ B32B 1/00; B32B 3/00
[52] U.S. Cl. ................ 428/53; 428/59; 428/68; 428/174; 428/175; 428/199; 428/211; 428/236; 428/264; 525/221; 525/243; 525/333.3; 525/331.9; 525/363
[58] Field of Search .................... 428/53, 59, 68, 428/174, 175, 199, 211, 236, 264; 525/221, 243, 333.3, 331.9, 363

[56] References Cited

U.S. PATENT DOCUMENTS

| | | | |
|---|---|---|---|
| 2,526,655 | 10/1950 | Sparks et al. | 260/28.5 |
| 2,756,217 | 7/1956 | Young et al. | 260/28.5 |
| 2,961,421 | 11/1960 | Cohen et al. | 260/29.5 |

(List continued on next page.)

FOREIGN PATENT DOCUMENTS

| | | |
|---|---|---|
| 0114441 | 2/1974 | Japan . |
| 1031728 | 9/1974 | Japan . |
| 0099096 | 10/1975 | Japan . |
| 3124183 | 4/1977 | Japan . |
| 8222170A | 6/1982 | Japan . |
| 3101434A | 10/1986 | Japan . |
| 1141-135 | 12/1983 | U.S.S.R. . |

OTHER PUBLICATIONS

*Corrugated Containers*, Maltenford, Pulp and Paper Technology (1970) Chap. 7–4.
E. L Cussler, "Barrier Membranes", *Journal of Membrane Sciences*, vol. 38 (1988), pp. 161–174.
Technical Data Sheet: DOW LATEX RAP 314NA (Nov. 1989), Dow Chemical, Midland Michigan.
Data Sheet: CP 654NA LATEX (1990), Dow Chemical, Midland, Michigan.
Technical Data Sheet: ZINPLEX 15 (Nov. 21, 1991), Ultra Additives, Paterson, New Jersey.
Technical Data Sheet: MOBILCER XMTD 240, and 241 (Nov. 16, 1992), Mobil Oil Corporation.
Mobil Product Data Sheet: (Dec. 05, 1991).
Technical Data Sheet: NOPCOTE® DS101 (1991), Henkel Corporation, Charlotte, North Carolina.
Data Sheet: BUBBLE BREAKER® 748 (Jun. 1982) Witco Chemical Corporation.

(List continued on next page.)

*Primary Examiner*—Randy Gulakowski
*Attorney, Agent, or Firm*—Ostrager Chong Flaherty & Onofrio

[57] ABSTRACT

Paperboard having a water-repellant coating which includes a polymer matrix/wax/pigment mixture and is applied to the paperboard as an aqueous formulation. The polymer matrix includes polymer chains which are ionically cross-linked through pendant carboxylic acid groups to provide, together with the wax and pigment components, a substantially continuous, water-repellant film which more readily breaks down under the alkaline conditions of repulping. The coated board also exhibits low slip and resistance to blocking, and is particularly well-suited in corrugated box constructions used in shipping containers for perishable food items such as meats, poultry, fishery products, fruits and vegetables. The pigmented or unpigmented coating formulations are also used as an overcoat over preprinted paperboard surfaces to simultaneously provide scuff and water resistance.

14 Claims, 3 Drawing Sheets

U.S. PATENT DOCUMENTS

| | | | |
|---|---|---|---|
| 3,058,938 | 10/1962 | Lindstrom | 260/29.6 |
| 3,251,709 | 5/1966 | Bonzagni | 117/76 |
| 3,260,690 | 7/1966 | Bohnert | 260/29.7 |
| 3,719,514 | 3/1973 | Taylor | 106/210 |
| 3,920,496 | 11/1975 | Wilkinson et al. | 156/82 |
| 3,985,937 | 10/1976 | Fife | 428/486 |
| 4,010,307 | 3/1977 | Canard et al. | 428/327 |
| 4,072,645 | 2/1978 | Cogley, Jr. | 260/29.7 |
| 4,098,944 | 7/1978 | Pollock | 428/284 |
| 4,102,845 | 7/1978 | Schroder et al. | 260/29.7 |
| 4,117,199 | 9/1978 | Gotoh et al. | 428/486 |
| 4,154,618 | 5/1979 | Burke | 106/27 |
| 4,254,173 | 3/1981 | Peer, Jr. | 428/204 |
| 4,262,050 | 4/1981 | Jenkins | 428/138 |
| 4,265,977 | 5/1981 | Kawamura et al. | 428/511 |
| 4,301,210 | 11/1981 | Yasuda et al. | 428/342 |
| 4,370,389 | 1/1983 | Ogura et al. | 428/511 |
| 4,400,440 | 8/1983 | Shaw | 428/511 |
| 4,544,597 | 10/1985 | Peer, Jr. et al. | 428/182 |
| 4,714,727 | 12/1987 | Hume, III | 524/271 |
| 4,933,012 | 6/1990 | Goetz | 106/204 |
| 4,972,018 | 11/1990 | Leadbetter | 524/47 |
| 4,980,024 | 12/1990 | Payne et al. | 162/135 |
| 5,030,325 | 7/1991 | Saji et al. | 162/135 |
| 5,080,759 | 1/1992 | Buzby et al. | 162/158 |
| 5,285,957 | 2/1994 | Halsell | 229/199 |
| 5,401,562 | 3/1995 | Akao | 428/211 |
| 5,626,945 | 5/1997 | Ma et al. | 428/174 |

OTHER PUBLICATIONS

Data Sheet: MICAWHITE 200, Franklin Industrial Minerals.

Data Sheet: MICA C–4000, KMG Minerals Inc.

Data Sheet: VANTALC® 6H, R.T. Vanderbilt Company Inc., (Oct. 1988).

Data Sheet PDX181, R. T. Vanderbilt Company Inc., (Feb. 1989).

Data Sheet: Black Hills Bond.

Data Sheet: Opazil AZ (EX 0408 EP).

REPULPABLE, WATER REPELLANT PAPERBOARD

SPECIFICATION

This is a divisional of application Ser. No. 08/290,645 filed on Aug. 15, 1994 now U.S. Pat. No. 5,635,279 which is a continuation-in-part of application Ser. No. 08/128,582 filed on Sep. 28, 1993, issued as U.S. Pat. No. 5,626,945 on May 6, 1997.

This application is a continuation-in-part of application Ser. No. 08/128,582 filed on Sep. 28, 1993, which is incorporated herein by reference.

FIELD OF INVENTION

The present invention relates to water repellant paper products such as coated paperboard and the like. More particularly, the invention relates to a water-repellant board having a pigmented polymeric/wax coating which exhibits improved repulpability, release characteristics, resistance to blocking and printability. The transparent coatings have application as an overcoat on preprinted paperboard surfaces to also provide scuff resistance.

BACKGROUND ART

Perishables, such as ice-packed chicken, meat, fishery products, fruits and vegetables are typically shipped in boxes or containers formed of corrugated paperboard which has been coated with a water repellant material. Conventional water-repellant coatings include natural and synthetic waxes and various synthetic organic compounds such as ethylene vinyl acetate. Such coatings improve the water resistance and decrease the water vapor transmission rate of the board so that the box is better suited for shipping perishables in a damp environment than an uncoated board. However, once used, such coated shipping boxes are difficult to recycle, since the coating tends to hold the fibers together and makes them difficult to separate. Thus, conventional wax-based coatings cannot be separated to the degree necessary to enable satisfactory repulping of the board and typically contain particles of the coating ("stickies") which stick to the papermaking equipment, wire, presses and dryer cans and make the resulting furnish unsuitable for papermaking.

Since it has generally not been economical to repulp wax-coated board, used shipping boxes and the like made from water-repellant linerboard have typically been dumped into a landfill or incinerated rather than recycled. Not only is this practice wasteful, it is also environmentally undesirable and a contributing factor to the growing solid waste disposal problem.

In addition, conventional water repellant linerboard can be difficult to work with, especially under warm conditions, since conventional water-repellant coatings may become tacky causing stacked or contiguous sheets of coated board to block or stick together. This blocking often persists after the sheets are cooled and detrimentally affects handling of coated linerboard blanks and boxes made of coated linerboard.

Thus it would be desirable to find an alternative for conventional wax coated and known polymeric water-repellant coatings that have comparable water resistance properties but also have the added benefit of repulpability.

U.S. Pat. No. 4,010,307 to Canard et al. discloses a gloss coating composition comprising an aqueous dispersion containing a binder and a pigment. The pigment comprises 70–95% calcium carbonate and 5–30% of a non-film forming synthetic polymer having particle sizes in the range of 0.05 to 0.3 microns.

U.S. Pat. No. 4,265,977 to Kawamura et al. discloses a paper coating composition comprising an aqueous dispersion of styrene-butadiene copolymer binder in combination with conventional pigment materials and dispersants. The coating formulations contain pigments including clay, talc, calcium carbonate, aluminum hydroxide, barium sulfate as well as pigment dispersing agents and antifoaming agents.

U.S. Pat. No. 4,301,210 to Yasuda et al. discloses an aqueous paper coating composition containing pigment and binder, where the binder may comprise styrene-butadiene copolymer and the pigment material may comprise clay, aluminum hydroxide, calcium carbonate, etc.

U.S. Pat. No. 4,980,024 to Payne et al. relates to a low slip linerboard used in corrugated boxes having increased surface friction. The linerboard is coated with a composition consisting essentially of an acrylamide, glycerine and an antiskid aqueous silica sol.

U.S. Pat. No. 3,985,937 to Fife discloses polymer latex emulsions as a laminating adhesive in the production of corrugated board. The compositions include a styrene-butadiene latex emulsion, clay, paraffin wax and a wetting agent. The wax component is preferably a wax emulsion and is present in the range of 0.1 to 4% based on the amount of polymer latex solid in the composition.

U.S. Pat. No. 4,117,199 to Gotoh discloses a repulpable paper having a coating of synthetic rubber latex and a wax. The coating is produced from an aqueous emulsion containing 100 parts of butadiene-methyl methacrylate copolymer latex and 5–100 parts of a wax emulsion (paraffin and polyolefin waxes). The emulsion coating is dried at an elevated temperature the same as or higher than the melting point of the wax.

The art does not provide aqueous pigmented/polymer/wax formulations coated on linerboard substrates to produce a paper product with low slip, water resistent and heat resistent characteristics that is easily recycled. The invention is directed to the provision of such recyclable paper stocks. It would be appreciated that advantage over known compositions would be obtained by providing aqueous coatings including pigments, a carboxylated polymeric binder, a wax emulsion and an ionic crosslinking agent to provide a coated paper product with low slip and easy recyclability.

Accordingly it is an object of the present invention to provide a water-repellant paperboard especially well-suited for use in the construction of corrugated boxes for shipment of perishable foods.

A further object of the present invention is to provide a water-repellant board of the character described which exhibits improved repulpability as compared with conventional wax coated boards.

An additional object of the present invention is to provide a water-repellant paperboard of the character described which exhibits low slip and improved resistance to blocking.

Another object of the present invention is to provide a water-repellant paperboard of the character described which is economical to produce and to recycle.

Still another object of the present invention is to provide a coating formulation useful as an overprint varnish over preprinted substrate surfaces to simultaneously provide scuff and water resistance.

Having regard to the foregoing and other objects and advantages, the present invention is directed to a water repellant paperboard which exhibits improved properties, particularly repulpability. The paperboard sheet is especially well suited for use as linerboard in the manufacture of corrugated boxes for shipping and storing food, particularly frozen foods such as ice-packed chicken, meat, fishery products, fruits and vegetables. The invention is useful in demanding applications which require a combination of high water repellency, high wet strength and durability under wet conditions for use in food containers.

DISCLOSURE OF INVENTION

In general, the invention is directed to a fibrous paper web such as paperboard having a water-repellant coating or film which includes pigments, wax and a polymer matrix of polymer chains ionically cross-linked through pendant carboxylic acid groups. The coating is applied as an aqueous formulation which is dried to provide the water-repellant coating on the paper web.

Under alkaline conditions, such as when contacted with repulping liquors containing NaOH or ammonia solutions, the ionic bonds in the coating disassociate to permit the film to be broken up in a more highly divided form for enhanced repulpability as compared with conventional (wax) coatings. The wax particles confer water-repellency and, in combination with the pigments, enhance repulpability by interrupting the continuous film formed by the polymer matrix and limit the cohesive strength of the film.

Other objects, features, and advantages of the present invention will become apparent from the following detailed description of the best mode of practicing the invention when considered with reference to the drawings, as follows:

DETAILED DESCRIPTION OF THE PREFERRED EMBODIMENT

Co-pending application Ser. No. 08/128,582 filed on Sep. 28, 1993, which is incorporated herein by reference, discloses aqueous coating compositions including carboxylated polymers, wax and crosslinking agents. The present invention compositions are modifications and improvements of these formulations.

As used herein, the term "water-repellant" merely refers to the hydrophobic character of the coating and its tendency to repel, block or not significantly absorb or transmit water in normal use. Thus, the term "water-repellant" is intended to include "water-resistant" and other terminology which connotes substantial as opposed to total or complete water blocking properties, and refers to a water-blocking property which is sufficient for the intended use requiring a degree of water-repellency.

Figure 1:
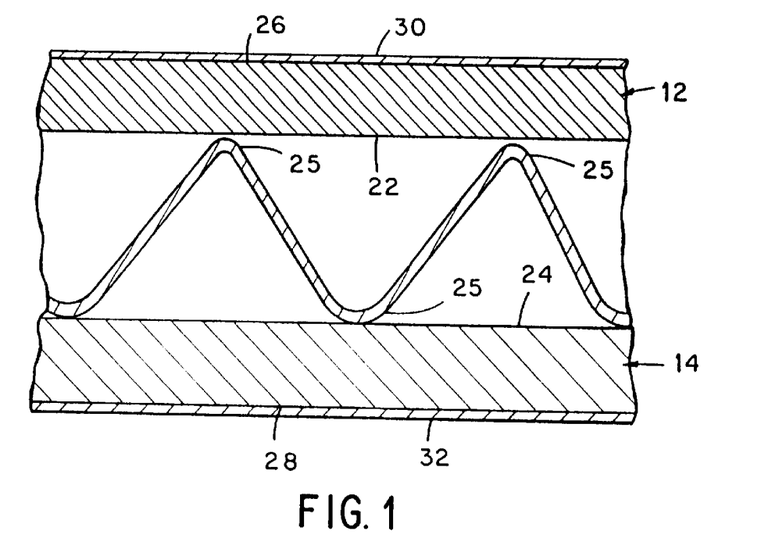
FIG. 1 is an enlarged cross-sectional view of a corrugated board incorporating a repulpable, water-repellant paperboard according to a preferred embodiment of the present invention.

With reference now to the drawings in which like reference characters designate like or similar parts throughout the several views, FIG. 1 shows a cross-section of a portion of a corrugated board 10 which, in the illustrated embodiment, is a combined construction of the double-face type having an inner linerboard 12 and an outer linerboard 14 supported in substantially parallel, spaced-apart relation by a corrugating medium or fluting 16. The board 10 of the illustrated embodiment is particularly well-suited for the production of shipping containers, as in the production of the open-top container 20 of FIG. 2 for shipment of frozen or meat, fruit, vegetables as well as ice-packed poultry and the like. The board 10 may thus be visualized as a portion of a blank for making such a container, or a portion of the assembled container.

The linerboards 12 and 14 each include interiorly facing surfaces 22 and 24, respectively, which are adhesively secured to tips 25 of the fluting 16 as by the application of a suitable adhesive to the tips of the flutes, such as an FDA approved starch based adhesive.

Each exteriorly facing surface 26 and 28 of linerboards 12 and 14 includes a coating or film layer 30 and 32, respectively, which comprises pigments and wax mixed with a polymer matrix of polymer chains ionically cross-linked through pendant carboxylate groups, which together with the wax confers water-repellency to the film but allows the coating to be repulpable under alkaline conditions. The coating is relatively stable under neutral and acidic conditions, but has been observed to disassociate under alkaline conditions encountered during repulping so that particles of the coating which are liberated from the fibrous portion of the linerboard in repulping are more finely divided in the resulting slurry.

The layers 30, 32 may be provided by applying through use of any suitable coating process, such as a rod and/or air knife coater, an aqueous coating including a carboxylated polymer, pigments and a wax emulsion with an ionic cross-linking agent to the surfaces 26 and 28 of linerboards 12 and 14.

Figure 2:
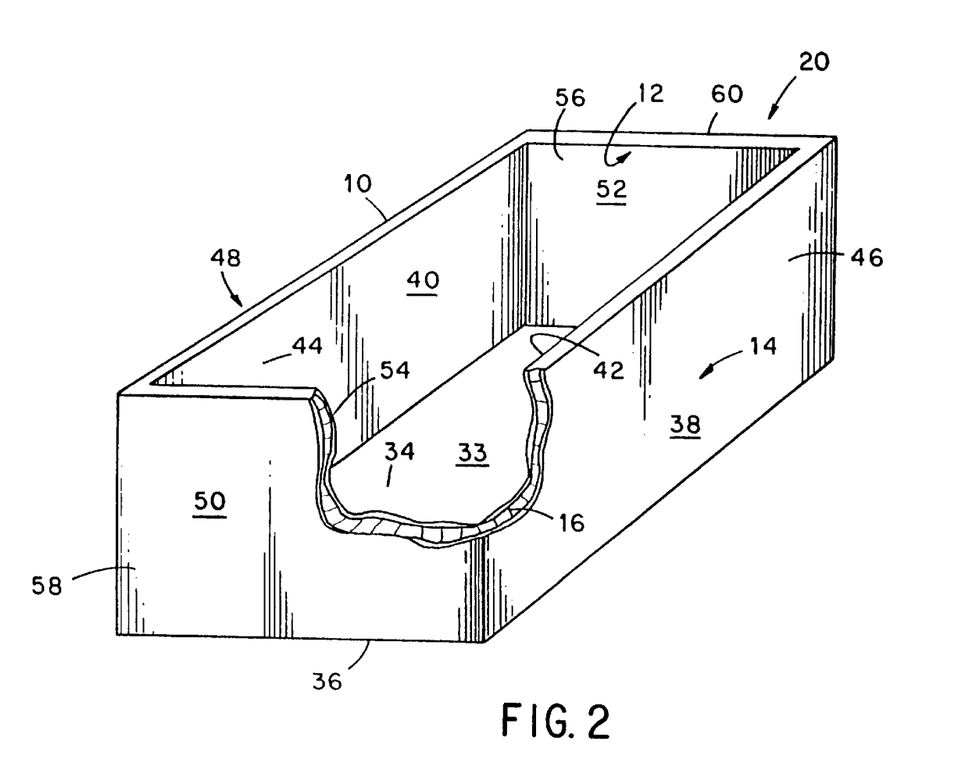
FIG. 2 is a perspective view of a corrugated container incorporating the board of FIG. 1.

The linerboard 14, corresponding to the outer surface of a container as illustrated in FIG. 2, may be preprinted on prior to the application of coating film layer 32. This overcoat layer, which alternatively may not contain a pigment component, further provides scuff resistance to the coated surface. A preferred way of applying the barrier coating on a preprinted substrate is to apply the coating in an overprint varnish station on the printing press apparatus. The overprint varnish station may be a rod or blade coater with subsequent drying capabilities.

The polymer component of the formulations generally comprise from about 25 to 45 percent by weight of the coating application (% by weight—dry basis). A preferred polymer for use in the coating is a styrene-butadiene (SB) copolymer polymerized with monomers having carboxylic acid pendant groups, e.g., acrylic acid and methacrylic acid. An especially preferred SB polymer for use in the invention is the carboxylated styrene-butadiene latex available under the trade name RAP 314NA from Dow Chemical Company of Midland, Mich. Another similar SB polymer which may be used is available under the tradename 654NA, also from Dow Chemical Company. The physical characteristics and properties of these commercially available materials are further described in technical data sheets which are incorporated herein by reference. These latexes are believed to have a chemical formula as follows:

Where, R = H, —(CH$_2$)$_n$H, etc.

Where, R=H, —(CH$_2$)$_n$H, etc.

Other ionically cross-linkable polymers which may be used include, by way of example and not by way of limitation, polymers selected from the group consisting of vinylidene chloride/vinyl chloride, styrene-acrylic, styrene-butadiene, acrylic polymers, acrylic copolymers, polyvinyl acetate, polyvinyl alcohol, ethylene-vinyl acetate, polyethylene vinyl chloride, polyvinylidene chloride and starch. Illustrative of some of the chemical formulations of these polymers are listed below:

1. Polyacrylates

2. Styrenated Polyacrylates

3. Vinylacetate Polyacrylates

4. Poly(Vinylidene Chloride/Vinyl Chloride) Acrylate

The polymers utilized in the coating compositions are carboxylated by copolymerizing with a monomer having carboxylic acid pendant groups. The monomers are generally an acrylate based monomer selected from the group consisting of an acrylic acid, methacrylic acid, itaconic acid, maleic (cis) acid, fumaric (trans) acid and other acrylate based monomers. Carboxylic acid pendent groups are necessary for the crosslinking reaction to occur. The polymer molecules utilized in the compositions are typically commercially available as carboxylated polymers.

The polymer chains are ionically cross-linked through pendent carboxylic acid groups with a crosslinking agent. The essentially ionic character of the carboxylate bridge between the polymer chains is believed to confer a high degree of stability to acids and water (essentially neutral) to form a superior water repellant and substantially continuous film on the paperboard which is not readily attacked by conditions of normal use. The crosslink is also believed to increase the effective glass transition temperature of the coating, so that contiguous sheets of the coated paperboard are less likely to block.

The crosslinking agent component of the coating is selected from the group consisting of zinc oxide ammonium complexes and zirconium oxide ammonium complexes. Preferably a metal oxide such as the zinc oxide ammonium complex available under the trade designation Zinplex 15 from Ultra Additives, Inc. of Paterson, N.J. is used. Other suitable crosslinking agents include ammonium zirconium carbonate crosslinkers such as the ammonium zirconium carbonate composition available under the trade name HTI Insolubilizer 5800 M from Hopton Technologies, Inc. Albany, Oreg. The crosslinking component may comprise 2 to 30 parts by weight of the coating and preferably makes up about 2–10 percent of the coating by weight (dry basis).

In an alternate embodiment, under certain conditions, the crosslinking agent can be excluded from the coating formulation. As long as the corrugated boards are produced and converted within two hours the crosslinking agent is not necessary. Other similar coatings that also may be used under these conditions are disclosed in copending U.S. patent application Ser. No. 08/290,626 to Ma et al. entitled "REPULPABLE AQUEOUS BARRIER COATINGS AND RELATED PAPER STOCKS" filed concurrently, and are incorporated herein by reference.

The wax component of the coating is preferably provided by a low molecular weight paraffin-polyethylene emulsion such as a mixture of a polyethylene (molecular weight in the range of from about 500 to about 2000), paraffin wax and an emulsifying agent. The polyethylene may comprise from about 1 to about 10 weight percent of the wax emulsion and the paraffin wax may comprise from about 30 to about 25 weight percent (wet basis). The emulsifying agent may comprise up to 7 weight percent, with the balance water (50–70%)

The wax emulsion may comprise from about 10 to about 30 weight percent of the coating (% by weight—dry basis). The % solids by weight of the coating and wax emulsion are as follows:

| MATERIAL | % SOLIDS | % WATER |
|---|---|---|
| COATING | 35–60 | 40–65 |
| WAX EMULSION | 30–50 | 50–70 |

A particularly preferred wax emulsion is the paraffin/polyethylene emulsion available under the trade name Mobilcer 136 from Mobil Oil Corporation of Fairfax, Va. Other suitable wax emulsions include paraffin/microcrystalline wax emulsions such as the wax emulsion sold under the trade designation Mobilcer J of Mobil Oil Corporation of Fairfax, Va. and the wax emulsion available under the trade name Mobilcer MTD 216 from the Mobil Oil Company or a paraffin wax emulsion, Mobilcer XMTD241, also available from Mobil Oil Company. Nopcote DS101, a synthetic wax emulsion, available from Henkel Corporation, Charlotte, N.C., may also be used. Nopcote DS101 is composed of 30–50% synthetic wax, up to 7% of emulsifying agents and 50–65% water (% by weight—wet basis). In addition, wax emulsions based on carnauba wax, carnauba/paraffin wax, carnauba/microcrystalline and carnauba/polyethylene resin may be used. The physical characteristics and properties of these commercially available materials are further described in technical data sheets which are incorporated herein by reference.

The pigments incorporated into the formulations are generally present in the amount of 25 to 60% (% by weight—dry basis). The composition of the pigment dispersion is typically as follows:

| % by weight (as-is) | Component |
|---|---|
| 40–65 | Water |
| up to 1 | Dispersant |
| 35–60 | Pigment particles |

The crosslinking agent, in the amount of 2–10%, is preferably added to the pigment dispersion to prevent gelling. The % solids of the pigment dispersion is generally 35–60%. Types of pigment dispersants include polyacrylates, complex phosphates or mixtures of both. The particle size of the pigments are of the size that 85–90% pass through a 325 mesh, which is a wire mesh consisting of 325 wires per inch.

The following description describes the general procedure for producing the pigment dispersions of the invention. Water, approximately 250 lbs, is charged to a Kady mill (volume 55 gallons) by Kinetic Dispersion Corporation, Scarborough, Me., which is equipped with high shear and intensive grinding capability. Agitation is initiated and the dispersant which is approximately 0.6 lbs of tetrasodiumpyrophosphate (TSPP) and 0.6 lbs of polyacrylate is added to the Kady Mill. The crosslinking agent, 25 lbs of Zinplex 15 which is a zinc ammonium carbonate complex (15% solids), is then added. The mixture is stirred for approximately 3 minutes. Finally, the pigment particles, such as MicaWhite 200–250 lbs, are added and stirred for 15 minutes. The pigment dispersion is then ready for blending with other components to form the final coating formulation, including a defoamer, i.e. Colloid 682 from Rhone-Poulenc, Marietta, Ga., the polymeric binder, i.e. Dow 314, the wax emulsion, i.e. Nopcote DS-101, and a cellulosic gum thickener, i.e. Admiral 3089FS from Aqualon, Wilmington, Del. Although the procedure has been described using specific materials the compositions are not limited to such and other suitable materials may be substituted.

The pigments are selected from the group consisting of aluminum trihydrate, barium sulfate, calcium carbonate, mica (potassium aluminum silicates), nepheline syenite (sodium potassium aluminosilicate), finely ground silica sand and other natural and synthetic type of silicates, talc (magnesium silicates), wollastonite (calcium metasilicates), bentonite (montmorillonite, smectite) and clay.

The pigments are generally available commercially under various tradenames and from various manufacturers. Representative pigments that may be used include, but are not limited to, MicaWhite 200, available from Franklin Minerals, Denver, Colo.; Mica C-4000, available from KMG Minerals, Kings Mountain, N.C.; Vantalc 6H and PDX 181 slurry, both talcs which are available from R. T. Vanderbilt, Norwalk, Conn.; Black Hills Bond, bentonite, available from Black Hills Bentonite, Mills, Wyo.; and Opazil AS, bentonite, available from Albion Kaolin Co., Hephziban, Ga. The physical characteristics and properties of these commercially available materials are further described in technical data sheets which are incorporated herein by reference.

Figure 4:
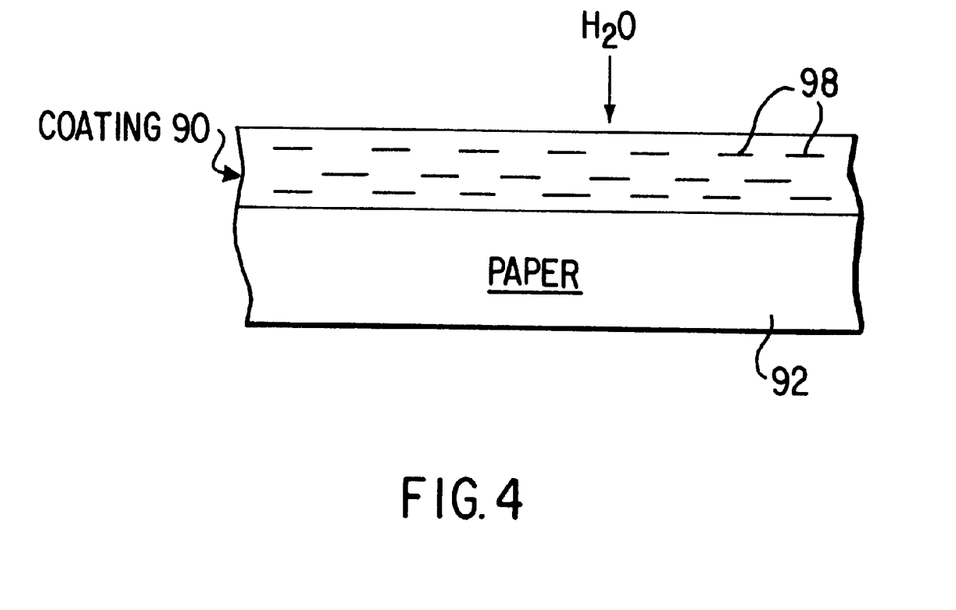
FIG. 4 is a schematic model of the coating composition "barrier membrane".

Preferred pigments incorporated into the formulations include mica, talc, clay and bentonite and are considered "platelet" type of pigments based on their particle shape, however, other types of pigments may also be used. When platelet type pigments are incorporated into the composition formulations improved water vapor barrier properties of the coatings is observed. This is believed to be due to the presence of a "tortuous path" created by the pigments. FIG. 4 is a schematic model illustrating the "barrier membrane" of the composition coating showing alignment of the pigment components.

As shown in FIG. 4, the coating 90 forms a substantially pin-hole free continuous film on the substrate surface 92. The film is comprised of an interlocking network of polymer, wax, and pigments. The polymer, preferably styrene-butadiene, wax and pigment components are randomly organized and evenly distributed within the coating film formed on the substrate surface. As illustrated, the platelet pigments 98 are mostly aligned parallel to the substrate surface due to the stress applied to the coating during the application process. The rod or blade coating essentially shears the coating and doctors the excess material off the surface. Under high shear between the rod or blade and the paper substrate, the platelet pigments are mostly aligned parallel to the substrate surface.

The good water vapor barrier properties of the invention coatings are believed to be provided by the presence of this "tortuous path". The permeability of barrier membranes and the theory of "tortuous path" are discussed in an article entitled "Barrier Membranes" by E. L. Cussler et al., published in the Journal of Membrane Sciences, Vol. 38, 1988, pp. 161–174, which is incorporated herein by reference. It is believed that the configuration of the polymer, wax and pigment components of the coating extend the diffusion path length and lengthens diffusion time which thus improves water barrier properties.

Hydrophobicity of the pigment mixtures can be adjusted by using highly hydrophobic pigments, i.e. talc, mica; medium hydrophobic pigments, i.e. wollastonite, nepheline syenite, finely ground silica and hydrophilic pigments, i.e. clay, bentonite, calcium carbonate, aluminum trihydrate, barium sulfate.

Typically, the pigments used in the invention coatings have relatively low refractive index, meaning that the pigmented coatings will generally be transparent. This has advantage when applied as an overcoat on a preprinted substrate or linerboard surface. Specifically, the mica, talc and bentonite pigments will not block the printing. If desired, whiteness of the coating can be adjusted by using various amounts of titanium dioxide and calcium carbonate in combination with the other pigments. In alternate overprint varnish applications the pigment component may be excluded.

The composition of the coatings 30 and 32 may further include thickeners to modify the viscosity of the composition for application of the coating. A suitable thickener is the cellulose gum rheological property modifier available under the trade designation Admiral 3089FS available from Aqualon Company of Wilmington, Del. Sodium or ammonium polyacrylates may also be used as thickeners for the composition.

In addition, organic silicone free or silicone-based defoamers may be used. Preferred defoamers are an organic, silicone-free defoamer available under the trade name Colloid 682 from Rhone-Poulenc of Marietta, Ga. and an organic, silicone-free defoamer available from Witco Chemical of New York, N.Y. under the trademark Bubble-Breaker 748. These defoamers are preferably used in an amount ranging from about 0.05 to about 0.5 percent by weight based on the total weight of the coating. Color pigments may also be added, such as to impart a whitish color for aesthetics.

Substrates in the present invention comprise a fibrous web of cellulosic materials and include a variety of coated and uncoated paper and paperboard, including bleached or unbleached hardwood or softwood, virgin or recycled and clay-coated or uncoated forms of paper or paperboard. Preferred application of the aqueous coatings are to the surfaces of wet-strength or non-wet strength linerboards for use in agricultural box applications.

The coating is preferably applied at the rate of from about 2 to about 3 pounds dry per 1,000 sq. ft. of board at a viscosity in the range of 400 to 700 cps such that the coating will comprise from about 2 to about 3 percent of the total weight of the board. Conventional board coated to provide approximately the same water resistance typically has a wax coating weight of between about 5–8 lbs/msf. Thus, a significant advantage of the present invention is that the desired water resistance may be realized with a coating provided in an amount which is only about 25–35% of that required when conventional wax coatings are used.

The degree of penetration of the coatings into the substrate surface is dependent on the viscosity of the composition as well as the type of substrate used. Generally the coatings compositions have a viscosity in the range of 150–2500 cps and a solids content greater than 35%. The low viscosities of the compositions results in little penetration into the substrate surface but enough for adhesion or binding of the coating to the substrate surface. Optionally, a primer such as polyvinylidiene chloride may be applied prior to the barrier coat to seal a porous substrate surface. Other primers and methods for their application which may be used in the invention are disclosed in copending U.S. patent application Ser. No. 08/059,790 to Quick et al. filed May 10, 1993 and Ser. No. 08/290,276 to Wenzel et al., entitled "RECYCLABLE AND COMPOSTABLE COATED PAPER STOCKS AND RELATED METHODS OF MANUFACTURE", filed concurrently. Both applications are incorporated herein by reference. Typically, substrates used in the invention, which are preferably linerboards having a weight of 26–90 lbs/msf, do not require a primer coat. In all embodiments the barrier coating adheres or binds to the substrate surface to form a continuous film.

The cross-linking reaction occurs in the process of drying the coated board which may be carried out using forced hot air and conventional can-dryers as by threading the web with the coating thereon through a stack of rotating cans, which advance the web through the dryers alternatively exposing opposite faces of the web to the hot surfaces of the cans. Preferably, the coated board is pre-dried before contacting the surfaces of the dryer cans by non-contact heating such as forced hot air (temp. 200–400° F.) for 5–15+ seconds to dry the coating to at least a substantially non-sticky state prior to contact drying at the can dryers.

The ionic bonding is believed to provide the coating with a polymer matrix represented generally by the formula P—S—$CO_2$—M—$O_2$C—S—P, wherein P represents the polymer as in the preferred styrene-butadiene polymer, S represents a polymer side chain, $CO_2$ and $O_2$C represent carboxylic groups and M represents a metal, such as zinc, from the cross-linking agent (such as zinc oxide ammonium complex) providing the ionic cross-link or bridge between adjacent polymer chains.

The ionic crosslinking reaction for a styrene-butadiene acrylate copolymer emulsion/zinc oxide ammonium complex is believed to be as follows:

Where, R = H, —$(CH_2)_n$H, etc.

With respect to the above example, it is believed that substantially all of the free ammonia resulting from the cross-linking reaction is liberated as ammonia gas during drying, and is therefore not present in the dried coating. In addition, it is believed that substantially all of the carbon dioxide and water reaction products are liberated during drying so that the dried coating is essentially void of reaction side products.

The fibrous web of the linerboards 12 and 14 may be of conventional construction including 1, 2, 3 or more plies (multi-ply), forming a composite web. The board may further have a conventional thickness C of from about 0.008 to about 0.03 inches and a weight of from about 26 to about 90 pounds per 1,000 sq. ft.

In the case in which the linerboard is to be used in the manufacture of corrugated containers for shipping ice-packed perishables, which is a use for which the invention is particularly well-suited, the fibrous web of the linerboards 12 and 14 may desirably comprise a high wet-strength paperboard produced by any of the known techniques. Generally speaking, wet-strength paper is a paper which retains 15 percent or more of its dry strength when thoroughly wetted with water.

A number of available paperboard products have wet strength in the range of 30 to 40 percent of the dry strength. Wet strength may be conferred by addition of wet-strength resins such as derivatives of urea-formaldehyde, melamine-formaldehyde and polyamide-epichlorohydrin added to the furnish stock after the last refiner in the papermaking machine. The benefits of the present invention are important in facilitating the repulping of wet strength paper which has generally been considered more difficult to repulp due to the presence of wet-strength resins. That is, although wet-strength paper is a material of choice for corrugated containers for shipping perishables due to the presence of water, the modification of the linerboard which confers wet strength coupled with the presence of resin or wax surface-coatings has compounded the difficulties in repulping this material. The surface coating of the present invention provides improved repulpability of such composites and, thus, lessens the repulping problems inherent in the use of wet strength wax-coated board.

For packaging applications such as meat, fruit, and vegetables, non-wet strength linerboard substrates such as 57 lb PL (pineliner) or 69 K (kraft) were coated with aqueous based barrier coating formulations. For shipping meat, the inside of the corrugated box is preferably coated for obtaining properties such as water/grease resistance and release properties at freezer conditions at 15–30° F. In the cases of boxes for fruit and vegetables, both the inside and outside surfaces of the corrugated boxes are preferably coated to provide water resistance sufficient to withstand the conditions encountered in the field, processing plants, storage, and distribution in cooler environment at 35–45° F.

Other alternate packaging embodiments include combined use of the present pigmented/wax/polymer coatings and use of the wax/polymer coatings described in copending Ser. No. 08/128,582. These later coatings provide high slip and improved release characteristics to the coated substrate surfaces. Thus, for instance, for shipping meat it may be desirable to apply the wax/polymer coating on the inside of the corrugated box for obtaining improved release properties at freezer conditions and coating the outside of the boxes with the pigmented/wax/polymer coating to provide low slip characteristics desirable during shipping. Other such variations and combinations are contemplated by the invention and depend on the application and the properties and characteristics desired for the packaging.

In all embodiments, for meat, fruit, and vegetables applications, the board was observed to be readily repulpable with uncoated corrugated containers at 100–120° F. and pH of 7–8, which are the standard commercial repulping conditions for recycled medium plant such as Waldorf Corporation in Minneapolis, Minn.

With further reference to FIG. 2, the container 20 may be erected from a single blank (not shown) produced from the corrugated board 10 by folding along score lines and/or gluing the blank in a manner well known in the art. The coating layers 30 and 32 are compatible with the use of lap-gluing adhesives conventionally used for coated boards, and the coating readily accepts water-based flexo inks.

The container 20 of the illustrated embodiment is of a type suitable for shipping iced perishables and includes a bottom panel 33 having an upwardly facing inner surface 34 and a downwardly facing outer surface 36. A pair of side panels 38 and 40 extend upwardly from opposite sides of the bottom panel 33 and include inwardly facing inner surfaces 42 and 44, respectively, and outwardly facing outer surfaces 46 and 48, respectively. A pair of end panels 50 and 52 extend upwardly from opposite sides of the bottom panel 33 adjacent the side panels 38 and 40. The end panels 50 and 52 likewise include inwardly facing inner surfaces 54 and 56, respectively, and outwardly facing outer surfaces 58 and 60.

Each inner surface 34, 42, 44, 54 and 56 of the container 20 may be provided by surface 26 of the corrugated board 10 coated with layer 30. Similarly, each outer surface 36, 46, 48, 58 and 60 is provided by surface 28 of the board 10 coated with coating layer 32. A top (not shown) may also be constructed of the board 10 of FIG. 1 to include short depending walls which fittingly receive the upper ends of panels 38, 40, 50 and 52. As mentioned above, however, it may only be necessary to coat the exteriorly facing surface of the top.

It will be seen that perishables and ice loaded within the container will be adjacent the water-repellant inner surfaces of the container. This restricts penetration of water and other fluids such as blood or juices into the container. Likewise, the water repellant outer surfaces limit entry of water and other fluids into the container 12 to avoid contamination of the contents. The provision of water repellant surfaces on both the interior and exterior of the container thus provides a container especially well suited for use where flow of fluid into and out of the container is to be avoided.

It will be appreciated that the use of the corrugated board 10 in the container 12 containing linerboards 12 and 14 coated in accordance with the invention improves the repulpability of the box so that containers made from such board may be more readily and more economically recycled than boxes made of conventionally (wax) coated water-repellant paperboard, and provides a recycled pulp of improved quality. Thus, it has been observed that under acidic conditions; i.e., below about pH 7, the ionic cross-linking between adjacent carboxylic acid groups of the polymer matrix provides a highly water resistant or hydrophobic film on the board surface which is of sufficient strength and integrity to withstand typical shipping and storage conditions encountered when shipping ice-packed perishables.

It has also been observed that a board coated according to the present invention exhibits improved repulpability as compared with water-repellant boards such as wax-coated boards and boards coated with polyethylene resin or extrudable film-forming thermoplastic resins such as polypropylene, polyamides, and ethylene/vinyl acetate co-polymers as well as polyolefin coatings, to name a few. It is further believed that the network of ionic crosslinking is not as stable to conventional alkaline media such as sodium hydroxide-based systems used in repulping as chemically cured compositions; i.e., coating compositions having covalent bonds formed by chemical reaction and/or heat. That is, under alkaline conditions; i.e., substantially above about pH 7, and especially under typical repulping conditions of pH 8 to 11 and 100° F. to 160° F., it is believed that the ionic bonds of the coated board of the invention more readily disassociate so that the coating breaks into smaller fragments faster for enhanced repulpability. The pigments and wax particles in the coating are believed to contribute to repulpability by interrupting the continuity or ordering of the cross-linked polymer chains, thereby lowering the cohesive strength of the film so that it is more readily dispersed during repulping.

In addition to facilitating repulping of the paperboard, the coating of the invention is believed to provide improved low slip characteristics and an increase in the glass transition temperature of the protective layer as compared with conventional coated boards of the type used in providing water-repellant shipping containers, to provide increased resistance to blocking.

Additionally, board produced in accordance with the present invention exhibits improved resistance to blocking under warm and humid conditions. This generally improves the handling properties of the board in relation to stacking of flattened-out boards or blanks and conveyance of the board through the stages of manufacture, and limits blocking of adjacent boxes in shipment and storage.

Figure 3:
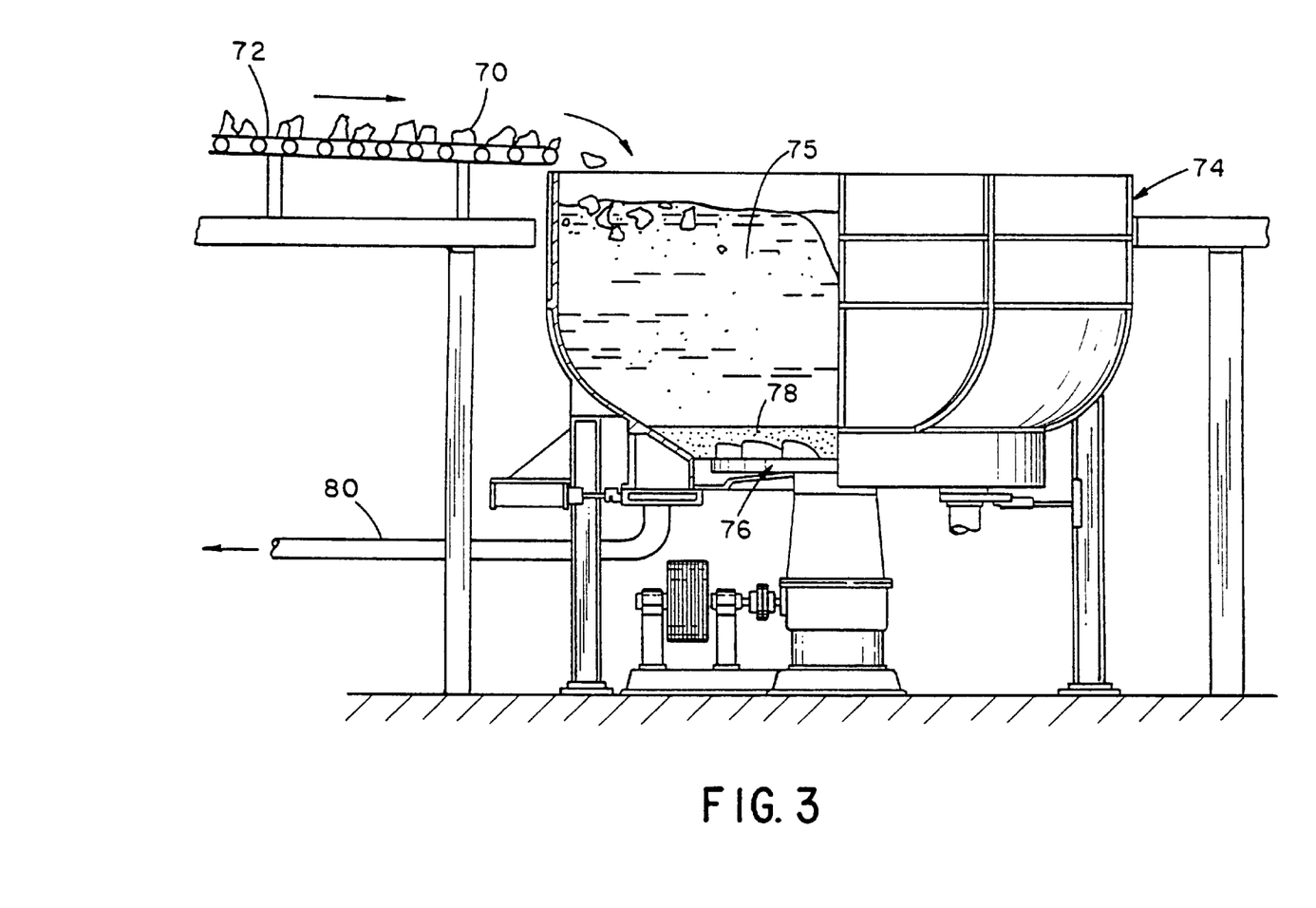
FIG. 3 is a diagrammatic view illustrating a process for recycling board according to the present invention.

With reference now to FIG. 3, there is shown a diagrammatic representation of the repulping portion of a process for recycling linerboard and containers provided in accordance with the present invention. In the process, waste paper or board 70 (i.e. dirty stock and also used boxes and paperboards, as well as papermill broke) in loose or baled form containing linerboard coated according to the present invention is charged, as by conveyor 72 or by hand as is the practice in many mills, into a conventional pulper known as a hydrapulper shown at 74. The hydrapulper 74 contains a sufficient amount of alkali such as NaOH and ammonia to provide a mixture 75 of waste paper and alkaline liquid having a consistency of between about 4 to 18 percent.

The hydrapulper 74 includes an agitator 76, such as a rotor, for agitating the mixture of waste paper and cooking liquor and may also include a heater such as a steam coil for maintaining a desired temperature in the mixture.

In the process, the stock and cooking liquor may be charged to the hydrapulper 74 continuously or on a batch basis and the resulting mixture agitated or subjected to agitation for a time sufficient to accomplish repulping of the waste paper to the necessary degree. When the stock has been reduced to the desired degree, it passes through a perforated plate 78 in slurry form and the slurry may then be directed for further processing as by conduit 80, such as to deflakers, secondary pulpers, screens, cleaners and refiners to further defiberize and prepare the pulp for papermaking.

The operating conditions of the pulper 74 are selected in accordance with the composition of the waste paper, and operation of the pulper for repulping of the waste paper 70 may be accomplished in a conventional manner, but may economically include used coated board as a repulpable material with improved results by virtue of the enhanced repulpability of the board of the invention. For example, to repulp a board provided in accordance with the present invention which includes wet strength board (pulp), the hydrapulper may be operated at conditions common for the repulping of wet-strength paper, such as the conditions set forth below in the first column of Table 1. For non-wet strength board, the milder conditions set forth in the second column of Table 1 may be employed.

TABLE 1

| REPULPING<br>CONDITIONS | WET STRENGTH<br>BOARD (PULP) | NON WET STRENGTH<br>BOARD (PULP) |
|---|---|---|
| TEMPERATURE | 140–160 ° F. | 80–120 ° F. |
| pH | 10–11 | 7–8 |
| TIME | 30–60 min | 10–20 min |
| ROTOR TIP SPEED | 3,500 ft/min | 3,500 ft/min |

Again, it is believed that the alkaline conditions within the pulper causes destruction of the ionic cross-linkages between adjacent carboxylic acid groups of the coating. This reduces the strength of the coating so that the action of the pulper breaks the coating down into particles of reduced size. Also, it has been observed that particles from the coated board of the present invention are "substantially free", which is used herein to mean that the coating substantially separates from the fibers and does not retain a significant amount of adhered or embedded pulp fibers when the board is repulped. This provides an improved recycled pulp/coating particle mixture for use in the production of paper products, particularly linerboard for boxboard applications.

While the mixture of pulp/coating particles is suitable for use in the manufacture of paper products, it will be understood that the mixture may be added with furnish derived from conventional recycling processes, and new furnish containing virgin pulp. In addition, it will be understood that a purer furnish (a higher percentage of pulp) may also be accomplished by subjecting the mixture to mechanical separation techniques (i.e. centrifugal separation) to separate the coating particles from the pulp.

The following Examples 1 to 8 illustrate various formulations, embodiments and applications of the invention coatings. In particular Examples 1 to 6 illustrate the aqueous pigment/wax/polymer composition coatings on various substrates and their resulting properties and characteristics, including repulpability. Example 7 illustrates an alternate composition coating without the incorporation of a crosslinking agent and Example 8 illustrates the coating compositions as applied to preprinted substrates. These examples are merely representative and are not inclusive of all the possible embodiments of the invention.

EXAMPLE 1

A coating for application to a board was prepared by charging 643 lbs of water to a Kady Mill, Kinetic Dispersion Corporation, Scarborough, Me., for high shear mixing. This mixing device disperses the pigment particles in water.

3 lbs of tetrasodium pyrophosphate (TSPP) was then added to the mixture during agitation. TSPP is a pigment dispersant which keeps the pigment particles from settling upon storage and transportation. 135 lbs of Zinplex 15, a zinc ammonium carbonate complex, was then added to the mixture as the crosslinking agent for the polymer, i.e. carboxylated styrene butadiene latex.

The mixture was then charged with 550 lbs of MicaWhite 200 and stirred for 10–30 minutes to obtain the proper dispersing of the pigment particles.

The high shear agitation blade of the Kady Mill was shut down and the mixture was agitated at a low shear using a device such as a lightening mixer. The mixture was then charged with 1350 lbs of Dow Latex RAP 314 NA, a carboxylated styrene-butadiene latex, available from Dow Chemical Company. 339 lbs of Nopcote DS101, a synthetic wax emulsion, was added to the mixture under agitation. Nopcote DS101 is composed of 30–50% synthetic wax, up to 7% emulsifying agents and 50–65% water (% by weight—wet basis). Finally, 6 lbs of Colloid 682 as a defoamer and 35 lbs of Admiral 3089FS as a thickener was added to this mixture to produce the coating mixture.

The resulting coating mixture had a solids content of about 45.2, a pH of about 9.2 to 9.6 and a viscosity between 350–400 cps.

The coating was applied at ambient temperature of about 25° C.–30° C. to 57 lb grade HK (Hydrokraft) linerboard (wet strength) in a single pass at a coating weight of about 2.5–3.0 lb (dry)/1000 ft$^2$ using a Michelman MRC-1000 rod coater followed by forced hot air and contact drying. The coated linerboard was converted to a double-faced corrugated board in a conventional corrugator and the coated board was observed to pass through the corrugator at a temperature of 350° F. trouble-free. The stack of corrugated sheets had a temperature of 150°–190° F. during normal operation and the corrugated board stacks exhibited no significant sticking/blocking after prolonged storage under the stack pressure and temperature.

The finished corrugated sheets were printed with aqueous flexo inks and die-cut using a rotary printer/die-cutter with a lead edge feeder. The converting rate was about 160–200 blanks/minute. Good dry-rub resistance was observed on the printed surface. The die cut blanks were formed into boxes.

Fresh chicken breast parts were packed into the boxes and covered with ice chips. The boxes were stored in a refrigerated cooler for 4–16 hours at 38–43° F. The boxes were then shipped by refrigerated truck for 260 miles at 26° F. The boxes performed as well as the conventionally curtain-coated wax boxes. The board was observed to be readily repulpable at 146° F. and pH of 8–11.

EXAMPLE 2

Board produced in accordance with Example 1 (30%) was combined with conventional uncoated board (70%) and defibered in a hydrapulper operated at 110° F./4–18% consistency/pH 7.6. No operational problems were observed.

EXAMPLE 3

Coating produced in accordance with Example 1 was applied at a temperature of about 25–30° C. to either 57 lb PL (pineliner) or 69 K (kraft) non-wet strength linerboard substrates in a single pass at a coating weight of about 2.0–2.5 dry lbs/1000 ft$^2$ using a Black-Clawson air knife coater followed by forced hot air drying. The coated linerboard was converted to a double-faced corrugated board in a corrugator and the coated board was observed to pass through the corrugator at a temperature of about 350° F. trouble-free. The stack of corrugated sheets had a temperature of 150–190° F. during normal operation and the corrugated board stacks exhibited no significant sticking/blocking after prolonged storage under the stack pressure and temperature.

The finished corrugated sheets were printed with aqueous flexo inks and die-cut using a rotary printer/die-cutter with a lead edge feeder. Printed blanks were folded and glued with hot melt adhesives. The converting rate was about 200–250 blanks/minute. Good dry-rub resistance was observed on the printed surface.

Fresh lettuce was harvested from the field, washed, and packaged with water spray in boxes formed from the corrugated sheets. The boxes were stored in a cooler at 35–45° F. for a period of 4–12 hours. The board was observed to be readily repulpable with uncoated corrugated board (OCC) at 100–120° F. and pH of 7–8.

EXAMPLE 4

Coating produced in accordance with Example 1 was applied at a temperature of about 25–30° C. to 57 lb PL (pineliner) and 69 K (kraft) non-wet strength linerboard substrates in a single pass at a coating weight of about 1.8–2.3 dry lbs/1000 ft$^2$ using a Black-Clawson air knife coater followed by forced hot air drying. In each case the coated linerboard was converted to a single-faced corrugated board in a corrugator and the coated board was observed to pass through the corrugator at a temperature of 350° F. trouble-free. The barrier coated side was the inside of the box for water/grease resistance and release properties. Each stack of corrugated sheets had a temperature of 150–190° F. during normal operation and the corrugated board stacks exhibited no significant sticking/blocking after prolonged storage under the stack pressure and temperature.

The uncoated side of the finished corrugated sheets were printed with aqueous flexo inks and die-cut using a rotary printer/die-cutter with a lead edge feeder. Printed blanks were folded and glued with hot melt adhesives. The converting rate was about 200–250 blanks/minute.

Fresh meat chunks were cut, washed, and packaged in boxes formed from the corrugated sheets. The boxes were stored in a freezer at 15–30° F. for a period of several hours. The meat chunks were observed to be easily removed from the boxes and did not stick to the boxes. The board was observed to be readily repulpable with other uncoated board at 100–120° F. and pH of 7–8.

EXAMPLE 5

Non-wet strength paperboard (such as 35–69 lbs kraft) produced in accordance with Examples 3 and 4 was defibered in a laboratory blender operated at 100–120° F./pH of 7–8/4% consistency.

Finished stock was further diluted down to 0.2% consistency with tap water. Handsheets were made from the stock using a standard TAPPI sheet mold. Handsheets with uniform formation without any stickies and non-defibered lumps were seen after 40–60 seconds of repulping time.

Conventional curtain-coating wax coated board (non-wet strength) was defibered in the laboratory blender under the same conditions. Curtain-coating wax layers were observed to break into small size agglomerates, which were visible and not acceptable for papermaking. Non-defibered lumps were also observed in the handsheet.

EXAMPLE 6

Wet-strength paperboard coated in accordance with Example 1 was defibered in a laboratory blender operated at 120–140° F./pH of 10–11/2.5% consistency.

Finished stock was further diluted down to 0.2% consistency with tap water. Handsheets were made from the stock using a standard TAPPI sheet mold. The sheets showed satisfactory defibering and were free from "stickies" after 40–60 seconds repulping time.

Conventional curtain-coating wax coated wet-strength board was defibered in the same device and conditions for comparison purposes. Curtain-coating wax layers broke into small size agglomerates, which were visible and unacceptable for papermaking. Non-defibered lumps were also observed in the handsheet.

EXAMPLE 7

Coating produced in accordance with Example 1, except that the crosslinker, Zinplex 15, is excluded. Examples 1 to 6 above were repeated using this coating without the crosslinking agent. The results obtained in each instance were comparable to the coatings including the crosslinking agent.

As long as the corrugated boards are produced and converted within 2 hours, the crosslinking agent i.e. Zinplex 15 is not necessary. If this condition is not met blocking occurs which can be problematic.

Generally, blocking, which refers to when corrugated sheets stick to other sheets, is a function of time, temperature, pressure and moisture. Time: If the corrugated sheet stack is converted within two (2) hours, which is a short enough time to prevent any significant blocking under normal operating conditions, the crosslinker is not needed. Temperature: Generally, during the colder winter season there is less tendency to block than during the hot, humid summer months. Pressure: If the sheet stack is high, higher pressure is exerted to the bottom of the stack and blocking is more likely to happen than in the situation where there is a shorter sheet stack. Moisture: If the coating is not fully dried, which may occur during operation malfunctions, the coating blocks easier.

EXAMPLE 8

Coating produced in accordance with Example 1, except that the coating is applied to preprinted linerboard substrates.

The preprinted linerboard substrates included clay coated 42 lbs CS (coating smooth or converting smooth); 42 lbs KW (klay white or mottle white); 57 lbs PL (pineliner); 57 lbs HK (hydrokraft); 69 lbs IPB (International Poultry Board); 69 lbs K (kraft); 35 lbs PL (pineliner) and 38 lbs CS (coating smooth) linerboard.

In another series of experiments the preprinted linerboard substrates were coated instead with the clear, unpigmented, wax/polymer coatings described in copending Ser. No. 08/128,582.

In each instance the transparent coatings, both pigmented and unpigmented embodiments, in addition to the water vapor resistance, block resistance, water resistance and grease resistance properties further provides scuff resistance to the coated surfaces.

Scuff resistance of the coatings was determined by visual observation during the box plant operations. In addition, the Sutherland Rub Tester was also used to judge the scuff resistance of the overprint varnish. A heated 4 lb weight (iron) is used in the test at 150–190° F. to rub one coated surface against another coated surface. The invention coatings survive approximately 75 rubs under such conditions without impairment to the preprinted surface, which indicates a suitable application as an overprint varnish.

TABLE II below summarizes some of the physical properties and characteristics of the coated substrates of the invention.

TABLE II

PHYSICAL PROPERTIES OF COATED SUBSTRATES

| PROPERTY | MEASUREMENT |
| --- | --- |
| COATING WEIGHT | 1.2–3.5 lbs/msf |
| COATING THICKNESS | 0.2–1 thousands of an inch |
| RECYCLABILITY AND REPULPABILITY | YES |
| LOW-SLIP | more than 30 degrees |
| WATER-RESISTANCE | 16 hours Cobb <3.5 g/100 in$^2$ |
| HOT MELT GLUEABILITY | YES |
| FLEXIBILITY | FAIR |
| BREATHABILITY | — |
| VAPOR TRANSMISSION | WVTR of 1–6 g/100 in$^2$-24 hrs at 100° F./90% R.H. |
| GREASE RESISTANCE | 6–8 |

As discussed earlier in the specification, the coated paper is readily repulped and recycled. The coated paper stock can be mixed with regular waste paper streams such as recycled newsprint and office waste for recycling purposes. The repulped coated linerboards can be recycled through regular cleaning equipment and run through conventional paper machines without any problems.

In the aqueous coatings of the invention the ionic bonds formed by the crosslinkers are generally dissociated at pH>9–10. After the ionic bond is dissociated the coating is kept separately from the cellulose fibers reclaimed in the repulping process with various cleaning equipments. The wax and pigment particles formulated in the coatings interrupt the polymer film structure formed on the paper surface. The film thus breaks down easier under the rubbing, wearing and shearing actions during the repulping process than the formulations without any pigment and wax particles at pH 7–8 and 100–120° F. The coatings provide increased recycling capability of the coated materials over the unrecyclable wax boxes.

The low slip surface characteristics of the coated paper surface may eliminate the plastic stretch wrap typically needed for wax coated boxes. The slide angle of the wax coated boxes is generally 16–17 degrees. The invention polymer/wax/pigment coating formulations provide a slide angle of more than 30 degrees, which is enough to prevent the boxes from sliding during shipping and distribution activities. Compositions containing polymer and wax components, as described in co-pending application Ser. No. 08/128,582 filed on Sep. 28, 1993, typically have a high slip with a slide angle of about 9 degrees, which is advantageous to enhance release characteristics of meat boxes and facilitate removal of frozen meat from the container.

The water resistance of the coated samples in Examples 1 to 8 were measured at 38° F./85% R.H. (relative humidity). The coating weight of the samples were in the range of 1.2–3.5 dry lbs/msf.

Using EVA-based (ethylene vinyl acetate) hot melt adhesives such as UPACO 9029-3 available from UPACO, Richmond, Va., HM60 available from Southern Chemical Corp., Mobile, Ala., 3M 3762, available from 3M, St. Paul, Minn., and HM 1828, available from H. B. Fuller, the aqueous barrier coated paper were found to be hot melt glueable. Both coated face-to-coated face and coated face-to-uncoated face type of glue joint were done and provided satisfactory results.

The flexibility of the coatings are fair. Under the severe repulping actions in the hydrapulper the coating is fragile, which is desirable for recycling. However, the coating is flexible, or tough enough, in applications for agricultural boxes.

The water vapor barrier level of the coatings are generally between 1–6 g/100 in$^2$–24 hrs at 100° F./90% R.H. Thus the coatings are not considered "breathable" but rather are a moisture vapor barrier film.

The kit, grease resistance, values are generally dependable on the coating thickness applied to the substrate surface. Typically the kit values for the composition coatings range from 6–8, which provide acceptable levels of grease resistance The coating compositions of the invention as discussed earlier may be applied by a number of different methods. In addition they may be applied either on-corrugator or off-line. In on-line corrugator application the coatings can be applied on both the wet- and dry-end of the corrugator. This provides cost savings compared to an off-line coating application. These processes however are more difficult to control than the off-line applications.

In the wet end application process, the coating can be applied and dried prior to the single facer and after the double backer. Additional drying equipment is required for this type of application method. In the dry end application process, coating can be applied after the hot plate section. Residual heat in the constructed corrugated board dries the coating. Equipment used for wet end applications can include a rod coater, i.e. MRC 1000, and a blade coater, WEC-130S and WEC-127, from Michelman, Inc. Blade coaters such as DEC-500 and PDD/4 are designed for dry end applications by Michelman, Inc.

Various off-line coaters such as a rod coater, blade coater and air knife coater can be used to apply the invention coatings. The coating is preferably dried thoroughly after the application in order to prevent any sticking or blocking within the coated rolls. Coated linerboard rolls are later run on a corrugated line to form the constructed board.

The present invention provides advantages over prior practice in providing a paperboard which can be recycled by conventional methods without any special measures or equipment. The aqueous coatings of the invention break up and disperse with the paper fibers when the material is run through a standard hydropulper under alkaline conditions.

It will be recognized by those skilled in the art that the compositions and coated stock of the invention and process have wide application in the production of packages or containers having water resistance, low slip, hot melt glueability, grease resistance and moisture vapor barrier characteristics. Advantageously, the coating compositions may also be used as overprint varnishes on preprinted linerboard substrates to impart additional scuff resistance to the coated substrate surface.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. A corrugated board which comprises:

fluting having a first side and a second side;

a first linerboard having an inner surface adjacent to, facing and adhered to said first side of said fluting and an outer surface opposite said inner surface;

a second linerboard having an inner surface adjacent to, facing and adhered to said second side of said fluting and an outer surface opposite said inner surface; and at least one of said outer surfaces of said first or second linerboard having a coating thereon which includes pigments, a wax component selected from the group consisting of paraffin wax and polyethylene wax emulsions and mixtures thereof, and a polymer matrix of polymer chains comprising a polystyrene-butadiene polymer copolymerized with a monomer having carboxylic acid pendant groups wherein said pendant carboxylic acid groups of said polymer chain are cross-linked by a zinc ion bonded between carboxylic acid groups of adjacent polymer chains; wherein the corrugated board exhibits improved repulpability and resistance to blocking.

2. The board as defined in claim 1, wherein the outside surface of each of said linerboards include said coating.

3. The board as defined in claim 1, wherein said crosslinking agent is selected from the group consisting of zinc oxide ammonium complexes.

4. The board as defined in claim 1, wherein said coating has a dry coating weight in the range of 1.2 to 3.5 lbs/msf.

5. The board as defined in claim 1, wherein said monomer is acrylate based monomer selected from the group consisting of an acrylic acid, methacrylic acid, itaconic acid, maleic (cis) acid, fumaric (trans) acid and other acrylate based monomers.

6. The board as defined in claim 1, wherein said coating comprises:

25–60% of said pigments;
   25–45% of said polymer;
   10–30% of said wax; and
   2–10% of said cross-linking agent.

7. The board as defined in claim 1, wherein said pigments are selected from the group consisting of aluminum trihydrate, barium sulfate, calcium carbonate, mica (potassium aluminum silicates), nepheline syenite (sodium potassium aluminosilicate), finely ground silica sand and other natural and synthetic type of silicates, talc (magnesium silicates) and wollastonite (calcium metasilicates).

8. A preprinted corrugated board which comprises:

fluting having a first side and a second side;

a first linerboard having an inner surface adjacent to, facing and adhered to said first side of said fluting and an outer surface opposite said inner surface;

a second linerboard having an inner surface adjacent to, facing and adhered to said second side of said fluting and an outer surface opposite said inner surface; and at least one of said outer surfaces of said first or second linerboard having a preprinted surface;

wherein said preprinted linerboard surface has a coating thereon which includes a wax component selected from the group consisting of paraffin wax and polyethylene wax emulsions and mixtures thereof, and a polymer matrix of polymer chains comprising a polystyrene-butadiene polymer copolymerized with a monomer having carboxylic acid pendant groups wherein said pendant carboxylic acid groups of said polymer chain are cross-linked by a zinc ion bonded between carboxylic acid groups of adjacent polymer chains; wherein the corrugated board exhibits improved repulpability and resistance to blocking.

9. The board as defined in claim 8, wherein said coating further includes a pigment selected from the group consisting of aluminum trihydrate, barium sulfate, calcium carbonate, mica (potassium aluminum silicates), nepheline syenite (sodium potassium aluminosilicate), finely ground silica sand and other natural and synthetic type of silicates, talc (magnesium silicates) and wollastonite (calcium metasilicates).

10. The board as defined in claim 8, wherein the outside surface of each of said linerboards include said coating.

11. The board as defined in claim 8, wherein said crosslinking agent is selected from the group consisting of zinc oxide ammonium complexes.

12. The board as defined in claim 8, wherein said coating has a dry coating weight in the range of 1.2 to 3.5 lbs/msf.

13. The board as defined in claim 8, wherein said monomer is an acrylate based monomer selected from the group consisting of acrylic acid, methacrylic acid, itaconic acid, maleic (cis) acid, fumaric (trans) acid and other acrylate based monomers.

14. The board as defined in claim 8, wherein said coating comprises:

25–60% of said pigments;
   25–45% of said polymer;
   10–30% of said wax; and
   214 10% of said cross-linking agent.

* * * * *

UNITED STATES PATENT AND TRADEMARK OFFICE
CERTIFICATE OF CORRECTION

PATENT NO. : 6,066,379
DATED : May 23, 2000
INVENTOR(S) : Tung Chan Ma, et al.

Page 1 of 1

It is certified that error appears in the above-identified patent and that said Letters Patent is hereby corrected as shown below:

<u>Claim 14,</u>
Last line, "214 10%" should read --2-10%--.

Signed and Sealed this

Twenty-sixth Day of June, 2001

*Attest:*

*Attesting Officer*

NICHOLAS P. GODICI
*Acting Director of the United States Patent and Trademark Office*